United States Patent [19]

Mickal et al.

[11] Patent Number: 4,779,182

[45] Date of Patent: Oct. 18, 1988

[54] POWER SUPPLY FOR AN ELECTROSTATIC FILTER

[75] Inventors: Hermann Mickal, Erlangen; Hartmut Gaul, Rottenbach; Walter Schmidt, Uttenreuth; Franz Neulinger, Erzhausen; Helmut Schummer, Heusenstamm, all of Fed. Rep. of Germany

[73] Assignees: Metallgesellschaft AG, Frankfurt am Main; Siemens AG, Munich, both of Fed. Rep. of Germany

[21] Appl. No.: 878,047

[22] Filed: Jun. 24, 1986

[30] Foreign Application Priority Data

Jun. 24, 1985 [DE] Fed. Rep. of Germany ....... 3522569

[51] Int. Cl.[4] ............................................. H02M 5/44

[52] U.S. Cl. ........................................ 363/37; 363/17; 363/28; 363/96; 363/98; 363/124; 323/903; 55/139

[58] Field of Search ....................... 363/17, 28, 96, 98, 363/124, 132, 136, 35, 37, 137; 323/903; 55/105, 139

[56] References Cited

U.S. PATENT DOCUMENTS

| | | | |
|---|---|---|---|
| 3,564,384 | 2/1971 | Adles | 363/17 |
| 3,641,740 | 2/1972 | Schumann et al. | 323/903 |
| 3,984,215 | 10/1976 | Zucker | 323/903 |
| 4,394,720 | 7/1983 | Gabor | 363/96 |
| 4,504,895 | 3/1985 | Steigerwald | 363/132 |
| 4,558,404 | 12/1985 | James | 55/105 |
| 4,638,416 | 1/1987 | Nevpaver et al. | 363/35 |
| 4,652,985 | 3/1987 | Bougle | 363/28 |
| 4,682,266 | 7/1987 | Huynh et al. | 323/903 |
| 4,733,137 | 3/1988 | Dunham | 363/17 |

FOREIGN PATENT DOCUMENTS

| | | |
|---|---|---|
| 0034075 | 8/1981 | European Pat. Off. . |
| 1923952 | 9/1973 | Fed. Rep. of Germany . |
| 2713675 | 10/1978 | Fed. Rep. of Germany . |
| 2416617 | 8/1979 | Fed. Rep. of Germany . |
| 2929601 | 1/1981 | Fed. Rep. of Germany . |

*Primary Examiner*—Patrick R. Salce
*Assistant Examiner*—Jeffrey Sterrett
*Attorney, Agent, or Firm*—Kenyon & Kenyon

[57] ABSTRACT

In order to scrub a waste gas, for example, of foreign matter by means of an electrostatic filter, a power supply is provided which contains a converter whose output feeds the primary winding of a high-voltage transformer. The secondary winding is connected to the electrostatic filter via a high-voltage rectifier. Disposed in the intermediate circuit of the converter is a control element for the intermediate circuit current. This shields the supply network against the effects of the power converter commutations and of short-circuits in the filter to a great extent. A limiter for the filter voltage and a temporary separation of the transformer from the inverter in case of filter short-circuits may be provided to reduce the stress on the components which can be made small if a high-frequency working cycle for the setter and the inverter is used.

10 Claims, 2 Drawing Sheets

POWER SUPPLY FOR AN ELECTROSTATIC FILTER

BACKGROUND OF THE INVENTION

The present invention relates to a power supply for an electrostatic filter.

To scrub waste gas or more generally, to separate foreign matter from a flowing medium, electrostatic filters are frequently used to whose plates and spray wires a d-c voltage of such magnitude is applied that in the medium conducted between the plates and the spray wires there occurs an ionization of the foreign matter contained in it and the foreign matter precipitates on the plates. In the interest of a high precipitation rate the d-c voltage (supply voltage) of the plates and spray wires is selected as high as possible. On the other hand, at a high supply voltage, ionization processes also take place in the gas itself, leading to a constant filter discharge, up to a corona discharge at the spray wires.

If the supply voltage increases beyond a limit value, the filter will discharge during short breakdowns or even during voltage breakthroughs, up to a stationary arc, unless the direct current furnished by the supply voltage is interrupted. Up to the subsequent re-establishment of a high d-c voltage, no noteworthy precipitation of foreign matter is then possible. In addition, these processes cause filter wear, particularly of its spray wires, and a short service life of the entire device.

The ionization processes and, hence, the mentioned supply voltage limit, depend on the electric field strength distribution between the plates of the electrostatic filter. Insulating layers of foreign matter deposited on the plates must be knocked off, collected and removed in certain time intervals—possibly while shunting off the supply voltage as briefly as possible. Furthermore, space charges with severe distortions of the potential difference between the plates will form due to the ionization, it being even possible for a reversal of the voltage gradient and spray direction to occur between plates and space charges.

Thus, the mentioned limit value is not constant during operation. For good precipitation, the filter supply voltage should be kept as closely as possible at this limit value, which virtually changes uncontrollably.

Commercially available electrostatic filters contain a power supply connected to two phases of a three-phase supply line and drawing from the supply line an alternating current via an electronic chopper. The output voltage of the chopper is phase-angle controlled via the firing angle and furnishes an alternating current of supply frequency which is phase-shifted relative to the input voltage and which, after step-up and rectification, then feeds the electrostatic filter as pulsating, continuous current. To come close to the optimum working conditions of the filter, DE-AS No. 19 23 952 suggests to increase the voltage at the electrostatic filter through the phase-angle control in the chopper according to a certain step-up function until the limit value corresponding to the momentary filter state is reached and a voltage breakdown or a similar sudden discharge of the filter takes place.

After a breakdown, the a-c chopper must usually be blocked first to avoid an arc and to wait for the deionization of the plasma formed. The no-current minimum pause is determined by the chopper frequency, i.e. the supply line frequency. It follows therefrom that the filter is fed by a direct current flowing virtually without a gap having a ripple corresponding to the supply line frequency and interrupted after a breakdown. The resultant curve of the filter voltage fed by this current is wavy and rises up to the breakdown.

Electrostatic filters have already been suggested in which it has been omitted to supply the filter with such a virtually gapless flowing direct current drawn from the supply line by an a-c chopper of supply line frequency, stepped up and rectified. Rather, the filter is charged by a sequence of individual voltage or d-c pulses. To replenish with each pulse the charge which has flowed across the medium during the interpulse periods, the frequency and/or the duration of the individual pulses are specified so that the mean current density of these isolated d-c pulses assumes a filter set current value matched to the respective filter state. This causes a filter voltage to be produced which has a ripple according to the pulse repetition frequency and is below the breakdown limit, if possible.

This causes the technical difficulty of making the required energy available to the filter by means of the short pulses. U.S. Pat. No. 3,641,740 suggests in this regard to charge, by means of the rectified supply line voltage, a series of capacitors which are then connected to the electrostatic filter via thyristors, high-voltage transformers and a halfwave rectifier. The width of the current pulses reaching the electrostatic filter is, e.g., 5% of the interpulse period between these pulses.

Today, a combination is sought as the optimum method in which the filter is first biased by a rectifier with an already relatively high, virtually constant, basic d-c voltage to which are then superposed an alternating voltage or isolated, individual voltage pulses for the generation of a wavy filter voltage.

According to U.S. Pat. No. 3,984,215, their level should be considerably above the breakdown voltage of the filter, but should be obtained through a very short pulse duration so that no arc will form when the filter discharges. Duration, shape and pulse repetition frequency of these isolated, individual pulses are matched to the respective loading condition of the filter. According to European Patent No. 0 034 075, there are fed to the filter, biased to the constant, d-c base voltage, isolated current pulses whose maximum amplitude is controlled in accordance with a set filter current value so that the filter is thereby charged in the form of pulses to a maximum voltage below the breakdown voltage. These current pulses are taken from a rectifier-fed intermediate circuit by means of a resonant-circuit converter designed for the desired pulse width or by means of an automatic frequency-controlled frequency changer with current stepping up. The filter voltage ripple is also assured in that a diode suppresses one polarity of the stepped up current pulses.

DE-OS No. 27 13 675 suggests a simple power supply in which the base voltage is furnished by a phase angle-controlled a-c chopper connected to two phases of a three-phase supply line succeeded by a transformer and rectifier. The electrodes, fed by the d-c base voltage, are connected via a coupling capacitor to the secondary winding of a high-voltage transformer whose primary winding is fed by a controlled rectifier via a Y-point tapped inverter. Thus, an unrectified alternating voltage of a frequency variable between 50 Hz and 2 kHz as a function of the load is superposed to the base voltage.

If these methods, determined by the characteristics of the precipitation process, are to be applied at the operating site of the filter, the requirements to be met by the supply network must also be taken into consideration, as they are becoming stricter and stricter. For instance, the reactive current and harmonics loading of the supply network as well as an asymmetrical load between the three-phase terminals of the supply line network must be taken into account. Finally, the installation costs should be kept as low as possible.

SUMMARY OF THE INVENTION

It is therefore an object of the present invention to provide a power supply for an electrostatic filter whose output voltage can be adppted virtually optimally to the technology of the precipitation process and whose reactions on the supply network are kept to a minimum. For instance, a power factor of about cos $\phi=1$ is possible for the supply network along with a low breakdown frequency or the avoidance of short-circuit overcurrents for the filter.

The above and other objects of the present invention are achieved by a power supply for an electrostatic filter having a transformer whose primary winding is connected via a converter to the supply network and whose secondary winding feeds the electrostatic filter via a rectifier on the filter side, the converter comprising an intermediate circuit frequency converter comprising a controlled rectifier arrangement on the supply network side for the generation of an intermediate circuit current and of an inverter having a controlled bypass path for the intermediate circuit current.

The intermediate d-c circuit makes it possible to match the power drawn from the supply network to the requirements of the supply network, largely independently of the operation of the inverter, and to shield it from the commutation reactions of the inverter. In particular, the inverter can be high-frequency operated, resulting in an advantageous power section design on the one hand and in an optimal adaptation to the precipitation process on the other hand.

BRIEF DESCRIPTION OF THE DRAWINGS

The invention will now be explained in greater detail in the following detailed description with reference to the drawings, in which.

DETAILED DESCRIPTION

With reference now to the drawings, in the figures, F is the electrostatic filter, between whose plates the medium (e.g., smoke or another waste gas), represented by an arrow M, is conducted and which is to be supplied from a supply network N with a voltage U picked up by a measuring element MU. For this purpose, the intermediate circuit of a frequency converter with a rectifier arrangement controllable on the supply one side and with an inverter on the filter side with a controlled bypass for the intermediate circuit is fed by the voltage of the supply network N. WP designates the primary winding of a high-voltage transformer which is connected to the a-c (or three-phase) output of the frequency converter and whose secondary winding WS feeds the electrodes of the filter F via a high-voltage circuit GRH, preferably an uncontrolled bridge rectifier.

Figure 1:
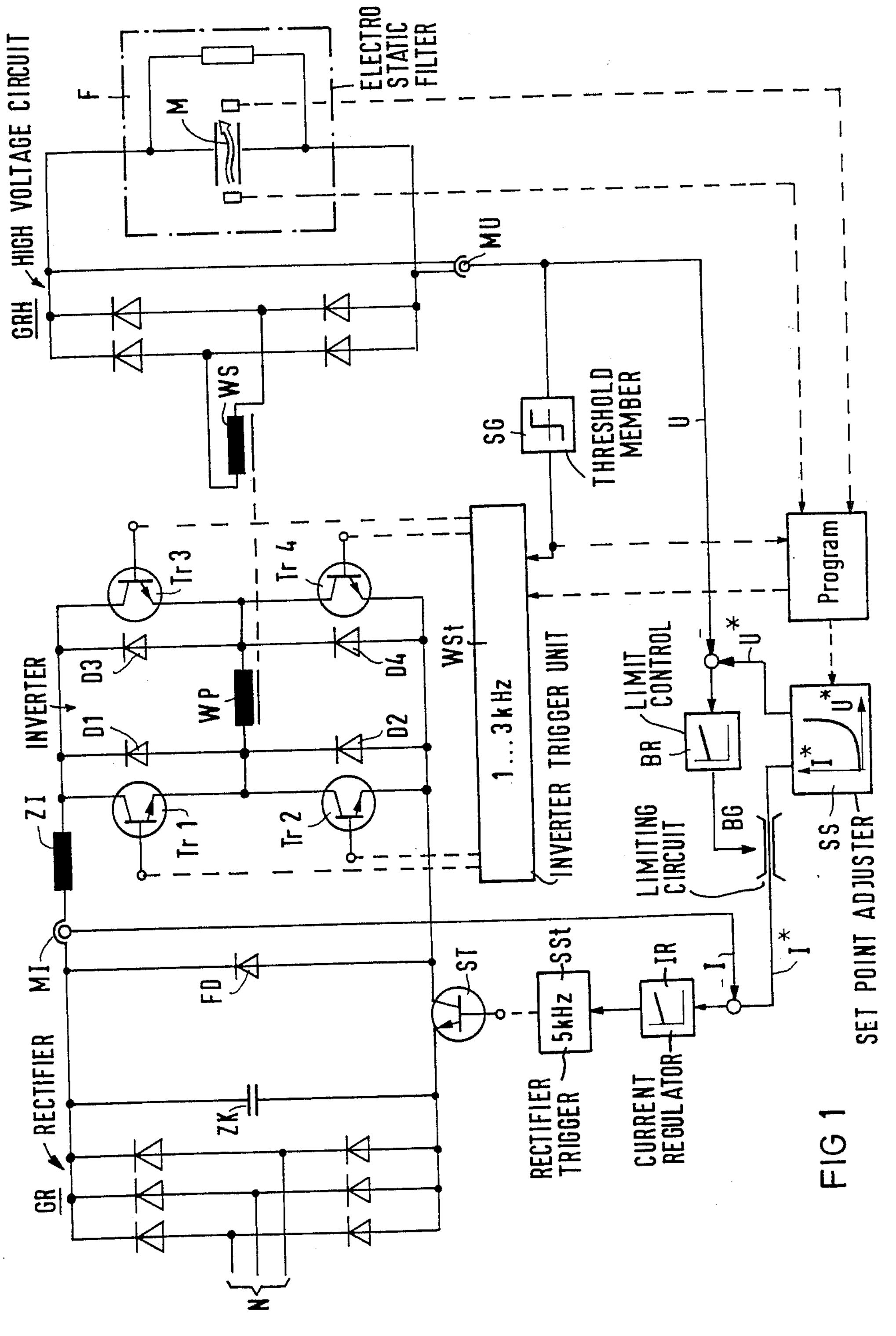
FIG. 1 shows a first embodiment of the power supply for an electrostatic filter according to the invention.

The controlled rectifier arrangement is preferably, as shown in FIG. 1, an uncontrolled rectifier GR followed by a current control element for the d-c current I of the intermediate circuit, measurable by means of a measuring element MI. If a d-c chopper or setter containing a bypass diode FD and the setting switch ST and operating at a high frequency, preferably about 5 kHz, is used as the control element, the succeeding intermediate circuit choke ZI (together with an intermediate circuit capacitor ZK) need only be tuned to smooth this high frequency, and it decouples the supply lines N connected to the rectifier GR from possible inverter and filter reactions. For the supply network there results practically only a symmetrical, active three-phase load (cos $\phi \approx 1$).

The intermediate circuit current, controllable by a current regulator IR and the trigger SSt of the control element ST to a reference value I*, flows through the choke ZI—from the supply network when the switch ST is conductive and through the recovery diode FD when the switch is blocked—virtually constant, independently of the switching state of the inverter.

According to FIG. 1, the inverter comprises a bridge circuit of the switches Tr1, Tr2, Tr3 and Tr4. A respective diode $D_1$ to $D_4$ is connected antiparallel to each switch so as also to make possible states in which the current flowing through the inductance WP generates a voltage opposed to the impressed direct current. Such states are characteristic of a chopper designed for 4-quadrant operation.

Such a circuit is commonly used as a pulse inverter which switches a direct voltage impressed through appropriate large intermediate circuit capacitors to the alternating voltage outputs within a half-period of a sinusoidal, low-frequency setpoint output voltage in the form of sinusoidal pusewidth-modulated, high-frequency voltage pulses with alternating sign. It must be made certain in these voltage pulses by interlocking that the direct voltage is not short-circuited by the simultaneous conduction of switches connected in series.

But this known circuit is operated here for the direct current impressed by the choke ZI and the regulator IR in order to generate, by alternatingly switching the direct current to the alternating current outputs, a high-frequency alternating current (frequency preferably 1 to 3 kHz).

If after each half-period the switches Tr1 and Tr4 or Tr2 and Tr3 are fired simultaneously, there will flow through the connected winding WP current pulses whose length equals the half-period and whose amplitude equals the direct current. But it is also possible to activate within one half-period an intermediate state in which, by simultaneous conduction of two switches connected in series (e.g., Tr1, Tr2 and/or Tr3, Tr4), or by activating a separate shunt switch, a bypass path is closed which conducts the impressed direct current like a short-circuit past the a-c terminals, thus shortening the pulse duration of the high-frequency a-c pulses; this means an additional, high-speed control of the a-c amplitude—already adjustable through the intermediate circuit d-c current.

Such "cross firings", temporarily opening the d-c bypass path are made according to FIG. 1 at least whenever a breakdown is detected in the filter. A threshold member SG, for instance, can recognize this from a breakdown of the filter voltage U. At the same time, the normal firing pulses are blocked by the trigger unit WSt of the inverter.

A program section "program" controls the restarting of the inverter, it being possible additionally to control, from the program section, the start-up of the a-c amplitude and/or the inverter frequency itself, e.g. as a function of the breakdown frequency and of the foreign matter content of the medium flowing in and out.

It is of special advantage that the current flowing into the transformer is always limited to the impressed d-c—also in case of a breakdown in the filter—, yet it is also maintained during an inverter blockage so that the inverter feed into the transformer can be resumed quickly. The transformer itself must be tuned to the high frequency of the inverter and, therefore, is very unsophisticated.

To stabilize an operating point (e.g., one specifiable by the program section) it is preferred to provide an additional voltage limiting control which restricts the filter voltage to the set-point of the filter voltage belonging to the specified operating point. For this purpose, the desired voltage U* set in the set-point adjuster SS is compared with the actual voltage U measured by the voltage measuring device MU and fed to the input of the current regulator IR via a limiting control BR of a limiting circuit BG.

Completely different parameters may be considered for the operation of the filter and converted into a correspondingly high-speed control and regulation. Therefore, the operation of the filter can also be optimized in many respects. This adaptability will be explained by way of an example in FIG. 2, but may also be realized in a completely different way, depending on the application.

For example, the foreign matter raw gas content (foreign matter content of the inflowing medium) and/or the foreign matter/scrubbed gas content (foreign matter content of the outflowing medium) may be used as input signals. Feed voltage and/or feed current of the filter can be optimized; in particular they may be controlled according to a given voltage/current characteristic. This characteristic may be varied as a function of the foreign matter raw gas content, i.e., of the load status of the filter. In addition, the control can react very quickly to every voltage dip and to the beginning and end of a knocking operation; also, the voltage ripple, i.e., the voltage fluctuation between an upper and lower limit, may be specified and optimized.

Figure 2:
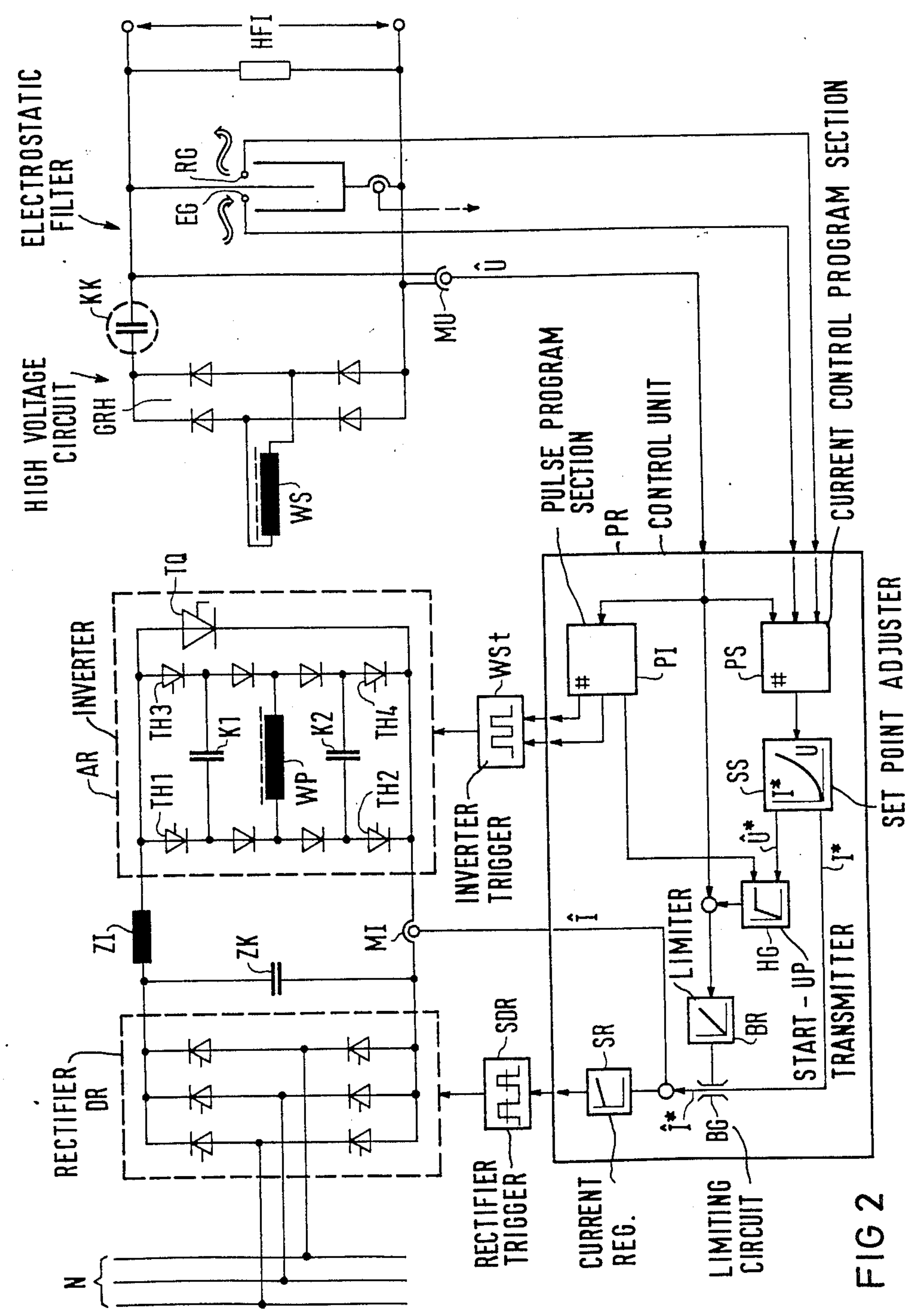
FIG. 2 shows a second embodiment of the power supply for an electrostatic filter according to the invention.

Schematically shown in FIG. 2 is the controlled rectifier arrangement as a controlled three-phase bridge rectifier DR which already contains the means necessary to vary the intermediate circuit current I (meter MI) of an intermediate circuit frequency converter and thus control the amplitude of the high-frequency chopper output current with a defined control behavior.

The intermediate circuit contains an intermediate circuit choke ZI, designed for the structure of the intermediate circuit current and, if applicable, complemented by an intermediate circuit capacitor $Z_K$.

The succeeding inverter AR generates the high-frequency alternating current. The inverter suited for this purpose and shown in FIG. 2 is known as an inverter with "phase-sequence quenching". A two-phase bridge is sufficient, although, in principle, three and multiphase bridges are possible and may even be advantageous in order to obtain, after step-up and rectification, a direct current as gapless as possible.

In the normal phase sequence, the controlled rectifiers TH1, TH4 and TH2, TH3 fire simulaneously and quench the previously fired rectifiers, reversing the charge of the commutation capacitors K1 and K2.

The shunt thyristor TQ is provided as a cross firing means. With such a cross firing, the given intermediate circuit current continues to flow through the choke ZI, but is then conducted via the bypass path TQ past the primary winding WP which, therefore, can be deenergized quickly in every phase position of the inverter and reenergized with the full intermediate circuit current after blocking just a few frequency converter clock pulses. After a breakdown, therefore, the required precipitation voltage can be built up again quickly. In other bridge circuits, such cross frirings can be initiated also by firing series-connected switches. They may also be provided to shorten the current-conduction time of the valves fired in the normal clock sequencing versus a half period of the inverter output current. The impressed intermediate circuit current itself is practically not influenced by these switching processes.

The operating point of the power supply is fixed in the control unit PR in that a set-point adjuster SS sets a set-point value I* for the intermediate circuit current or the amplitude of the a-c output current, the deviation of which drives the trigger SDR for the controlling means of the controllable rectifier arrangement via a current regulator SR. The set-point value I* can be determined in particular in accordance with a current/voltage characteristic stored in the set-point adjuster SS, the optimal voltage U* being specified by a current control program section PS. U* may be varied periodically, e.g., as a function of the residual foreign matter content measured by a flue gas probe RG in order to generate the mentioned filter supply voltage ripple. The optimal base level for U* may be determined by a flue gas probe EG as a function of the foreign matter raw gas content, or it may be varied within an iterative search procedure so that the precipitation rate is high on the one hand and the frequency of breakdown and voltage dips at the meter MU is low on the other hand.

Generally, limiting the voltage to the specified value of U* is advantageous. To accomplish this, the feed voltage U difference between set-point and actual is locked onto a limiter BR which affects a limiting circuit BG limiting the current set-point. For example, to be able after a breakdown to increase the feed voltage according to a given curve shape there is provided at the set-point input of the limiter BR a start-up transmitter HG, the final value of which can be varied by a pulse program section PI (e.g., as a function of the frequency of voltage breakdowns picked up by the voltage mete MU. According to the respectively provided precipitation technology, other actual and set-point value relations can be processed in the two program sections PS and PI to make an optimal intervention in the control of the alternating current possible by controlling the start-up transmitter HG and/or the set-point adjuster SS for all possible operating conditions, e.g., also during a knocking-off operation (removal of the foreign matter precipitated). In accordance with the respectively specified operating point on the filter characteristic, the voltage limiter BR makes stable operation of the power supply possible up to the vicinity of the breakdown point, thereby reducing the breakdown frequency and increasing the filter life.

The pulse program section PI performs the additional task of specifying the a-c output frequency and, hence, the high frequency of the inverter AR through an appropriate operation dependent control signal for the inverter trigger WSt. It also generates the switching signal for the bypass path (rectifier TQ) and the temporary stopping and restarting of the inverter after a breakdown. In addition, the direct current taken from the high voltage rectifier GRH can be interrupted by periodic blocking ("packet formation"), and voltage ripple on the filter can thus be enforced also.

Due to this control of the d-c base voltage of the filter, the use of additional, isolated high-voltage pulses becomes largely unnecessary. However, the coupling capacitor KK shown in FIG. 2 also facilitates the additional locking-on of such pulses which can be applied to the appropriate input terminals HFI of the filter.

The high frequency of the alternating current used here makes considerable savings on the transformer possible. Similar savings are also obtained for the intermediate circuit choke.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A power supply for an electrostatic filter comprising transformer means having a primary and a secondary winding, low voltage converter means coupled to said primary winding, and high voltage recitifier means coupling the secondary winding to the electrostatic filter, the converter means comprising:

d-c current fed inverter means for generating current pulses of alternating polarity at a given inverter frequency, said inverter means including a controlled bypass path means for generating interrupts between the current pulses;

d-c intermediate circuit means coupled to a d-c input of said inverter means, said d-c intermediate circuit means including d-c current choke means;

controllable rectifier means coupling a supply network to the d-c intermediate circuit means; and current controller means for controlling the d-c current supplied by the controlled rectifier means to the d-c intermediate circuit means, said d-c current being essentially constant during an inverter frequency period.

2. The power supply recited in claim 1, wherein the controlled rectifier means of the converter means comprises an uncontrolled rectifier and a current control means coupled to the output for supplying current from the uncontrolled rectifier to the intermediate circuit.

3. The power supply recited in claim 2, wherein the current control means comprises dc chopper means including bypass diode means and having a high operating frequency, preferably about 5 kHz, said inverter means being coupled to the intermediate circuit by choke means tuned to smooth said high frequency.

4. The power supply recited in claim 1, wherein the inverter means comprises a bridge circuit comprising a plurality of electronic switch means, each switch means having a diode means connected antiparallel thereto, said bypass path means being switchable by the conduction of series-connected bridge branches of said bridge circuit.

5. The power supply recited in claim 1, wherein the inverter means comprises phase sequence quenching means and the bypass path means comprises controlled shunt means disposed across a d-c input thereof.

6. The power supply recited in claim 1, further comprising set-point transmitter means for providing a set-point value of the intermediate circuit current determined in accordance with a current/voltage characteristic from a given optimum voltage set-point value, and further comprising current regulator means for controlling the intermediate circuit current.

7. The power supply recited in claim 6, further comprising voltage limiter means for limiting the actual current set-point value in accordance with the deviation of the filter voltage from a voltage tuned to an optimal current setpoint value.

8. The power supply recited in claim 1, wherein the inverter means couples the primary winding of the transformer means to the dc intermediate circuit within one half-period of a given, high-frequency working frequency, preferably a working frequency of about 1 to 3 kHz, for a given pulse duration, and said transformer means comprises transformer means for operating at said high working frequency.

9. The power supply recited in claim 1, further comprising means for blocking direct current flowing into the inverter means in case of a short-circuit within the filter.

10. The power supply recited in claim 1, wherein said rectifier means coupling the secondary winding to the filter comprises an uncontrolled bridge rectifier.

* * * * *